United States Patent
Yang et al.

(10) Patent No.: US 12,270,674 B2
(45) Date of Patent: Apr. 8, 2025

(54) METHOD AND APPARATUS FOR ROUTE NAVIGATION, ELECTRONIC DEVICE, COMPUTER READABLE MEDIUM

(71) Applicant: Beijing Baidu Netcom Science Technology Co., Ltd., Beijing (CN)

(72) Inventors: Zhaohui Yang, Beijing (CN); Xuecen Shen, Beijing (CN); Xiao Li, Beijing (CN); Linghao Pu, Beijing (CN); Chuansheng Jia, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 260 days.

(21) Appl. No.: 17/719,913

(22) Filed: Apr. 13, 2022

(65) Prior Publication Data
US 2022/0236069 A1    Jul. 28, 2022

(30) Foreign Application Priority Data

Sep. 30, 2021   (CN) .......................... 202111157566.1

(51) Int. Cl.
*G01C 21/36*      (2006.01)
*G01S 19/24*      (2010.01)
(Continued)

(52) U.S. Cl.
CPC ..... *G01C 21/3638* (2013.01); *G01C 21/3602* (2013.01); *G01C 21/3647* (2013.01);
(Continued)

(58) Field of Classification Search
CPC ............ G01C 21/3638; G01C 21/3602; G01C 21/3647; G01C 21/367; G01C 21/3691;
(Continued)

(56) References Cited

U.S. PATENT DOCUMENTS 10,832,417 B1   11/2020  Tzur
2007/0139262 A1*  6/2007  Scherzinger .......... G01S 19/485
                                                701/472
(Continued)

FOREIGN PATENT DOCUMENTS

CN       107240156 A    4/2017
CN       106663338 A    5/2017
(Continued)

OTHER PUBLICATIONS

English Translation CN110031880B (Year: 2024).*
English Translation CN 110926334 A (Year: 2024).*

*Primary Examiner* — Rami Khatib

(74) *Attorney, Agent, or Firm* — Ice Miller LLP; Justin Swindells

(57) ABSTRACT

The present disclosure provides a method and apparatus for a route navigation, which relate to the technical fields of computer vision, image processing, augmented reality and the like. An implementation solution is: performing an augmented reality navigation on a current route based on real-time acquired GPS information of a terminal; acquiring SLAM (simultaneous localization and mapping) coordinates of the terminal; converting, in response to determining that the GPS information meets a preset positioning difference condition, the SLAM coordinates into calculated geographic coordinates; and performing an augmented reality navigation on the current route based on the calculated geographic coordinates.

12 Claims, 3 Drawing Sheets

(51) Int. Cl.
*G01S 19/42* (2010.01)
*G06T 7/579* (2017.01)

(52) U.S. Cl.
CPC ....... *G01C 21/367* (2013.01); *G01C 21/3691* (2013.01); *G01S 19/24* (2013.01); *G01S 19/42* (2013.01); *G06T 7/579* (2017.01)

(58) Field of Classification Search
CPC ....... G01C 21/20; G01C 21/365; G01S 19/24; G01S 19/42; G01S 19/396; G01S 19/47; G01S 19/485; G06T 7/579; G06F 16/29; G06F 3/011; G06V 20/20; G06V 20/56
See application file for complete search history.

(56) References Cited

U.S. PATENT DOCUMENTS

| | | | |
|---|---|---|---|
| 2017/0116783 | A1 | 4/2017 | Huang |
| 2017/0201708 | A1 | 7/2017 | Igarashi et al. |
| 2019/0114507 | A1 | 4/2019 | Chiu |
| 2020/0387711 | A1 | 12/2020 | Lu |
| 2021/0156695 | A1 | 5/2021 | Zhang |
| 2022/0049960 | A1 | 2/2022 | Xie et al. |
| 2022/0398775 | A1* | 12/2022 | Streem ................... G06T 17/05 |
| 2023/0259138 | A1* | 8/2023 | Chen ....................... G06V 10/80 700/245 |

FOREIGN PATENT DOCUMENTS

| | | | | | |
|---|---|---|---|---|---|
| CN | 110031880 | A | | 7/2019 | |
| CN | 110276794 | A | | 9/2019 | |
| CN | 110926334 | A | * | 3/2020 | .......... G01B 11/002 |
| CN | 111065891 | A | | 4/2020 | |
| CN | 112146645 | A | | 12/2020 | |
| CN | 112305576 | A | * | 2/2021 | |
| CN | 112432641 | A | | 3/2021 | |
| CN | 112461228 | A | * | 3/2021 | .......... G01C 21/005 |
| CN | 112558087 | A | * | 3/2021 | .......... G01C 21/165 |
| CN | 112835085 | A | | 5/2021 | |

* cited by examiner

METHOD AND APPARATUS FOR ROUTE NAVIGATION, ELECTRONIC DEVICE, COMPUTER READABLE MEDIUM

CROSS-REFERENCE TO RELATED APPLICATIONS

The present application claims the priority of Chinese Patent Application No. 202111157566.1, titled "METHOD AND APPARATUS FOR ROUTE NAVIGATION, ELECTRONIC DEVICE, COMPUTER READABLE MEDIUM", filed on Sep. 30, 2021, the content of which is incorporated herein by reference in its entirety.

TECHNICAL FIELD

The present disclosure relates to the field of computer technology, in particular to the technical fields of computer vision, image processing, augmented reality and the like, and more particular, to a method and apparatus for a route navigation, an electronic device, a computer readable medium, and a computer program product.

BACKGROUND

By superimposing virtual AR (Augmented Reality) identifications that fit the navigation space in real-scene camera pictures, augmented reality navigation may be intuitively provided for user.

The conventional two-dimensional map walking navigation has high cost of map recognition, and some users have difficulty finding the ways. In addition, in places with tunnels and high buildings, augmented reality navigation using GPS signals is easily interfered, or the GPS signals may be interrupted, resulting in 2D plane navigation completely unavailable.

SUMMARY

A method for a route navigation, an electronic device, and a computer readable medium are provided.

According to a first aspect, a method for a route navigation is provided. The method includes: performing an augmented reality navigation on a current route based on real-time acquired GPS information of a terminal; acquiring SLAM coordinates of the terminal; converting, in response to determining that the GPS information meets a preset positioning difference condition, the SLAM coordinates into calculated geographic coordinates; and performing an augmented reality navigation on the current route based on the calculated geographic coordinates.

According to a second aspect, an electronic device is provided. The electronic device includes: at least one processor; and a memory communicatively connected to the at least one processor, where the memory stores instructions executable by the at least one processor, and the instructions, when executed by the at least one processor, cause the at least one processor to perform the method as described in any implementation of the first aspect.

According to a third aspect, a non-transitory computer readable storage medium storing computer instructions is provided, where the computer instructions cause a computer to perform the method as described in any implementation of the first aspect.

The method for a route navigation provided by embodiments of the present disclosure, first performs an augmented reality navigation on the current route based on real-time acquired GPS information of the terminal; secondly acquires SLAM coordinates of the terminal; then converts, in response to determining that the GPS information meets the preset positioning difference condition, the SLAM coordinates into calculated geographic coordinates; and finally performs an augmented reality navigation on the current route based on the calculated geographic coordinates.

It should be understood that the content described in this section is not intended to identify key or important features of the embodiments of the present disclosure, nor is it intended to limit the scope of the present disclosure. Other features of the present disclosure will become readily understood from the following specification.

BRIEF DESCRIPTION OF THE DRAWINGS

The accompanying drawings are used for better understanding of the present solution, and do not constitute a limitation to the present disclosure. In which.

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described here without departing from the scope and spirit of the present disclosure. Similarly, for clearness and conciseness, descriptions of well-known functions and structures are omitted in the following description.

Figure 1:
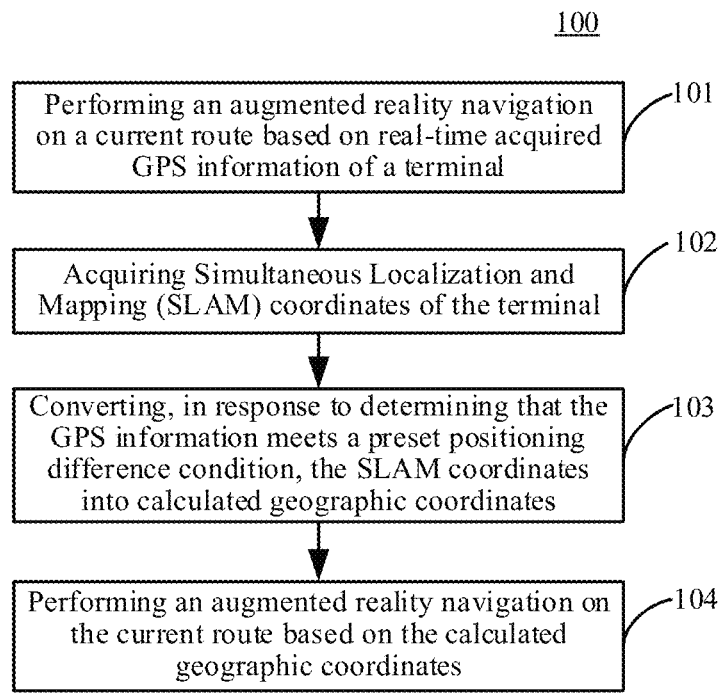
FIG. 1 is a flowchart of an embodiment of a method for a route navigation according to an embodiment of the present disclosure.

FIG. 1 shows a flow 100 of an embodiment of a method for a route navigation according to an embodiment of the present disclosure, and the method for a route navigation includes the following steps:

Step 101, performing an augmented reality navigation on a current route based on real-time acquired GPS information of a terminal.

In the present embodiment, the terminal may be a mobile terminal held by an object, the mobile terminal is provided with a camera apparatus, and the camera apparatus may photograph a scene around the terminal or the object in real time. When the object has augmented reality navigation needs, an application that supports augmented reality display may be opened on the terminal, and the current route and an augmented reality indicator superimposed on the current route may be viewed in real time on an interface corresponding to the application. In this implementation, the object is one or more users who have permission to use the terminal.

In the present embodiment, an executing body on which the method for a route navigation runs may be a processor of the terminal, or a server that communicates with the terminal, or other electronic equipment that communicates with the terminal.

In the present embodiment, a GPS (Global Positioning System) may be provided on the terminal. When a road section where the terminal is currently located is detected, the GPS information of the terminal may be acquired through the GPS on the terminal. The GPS information of the terminal includes: GPS coordinates, a moving position of the terminal handheld by the object, a duration of the terminal in each moving position, a time point of the terminal in each moving position, relevant information of the terminal in each moving position, etc., where the GPS coordinates are short for global positioning system coordinates, which is generally composed of two parameters, longitude and latitude, and also called latitude and longitude.

In the present embodiment, performing the augmented reality navigation on the current route based on the GPS information of the terminal includes: displaying the current route on the interface of the application that supports an augmented reality based on preset map data, and converting the GPS coordinates in the GPS information of the terminal into geographic coordinates, indicating a current position of the terminal on the displayed current route through an AR virtual positioning identification based on the geographic coordinates.

Step 102, acquiring SLAM (simultaneous localization and mapping) coordinates of the terminal.

In the present embodiment, an apparatus for collecting SLAM (Simultaneous Localization and Mapping) information, such as ARKit and AREngine, may be provided on the terminal. Using the apparatus, a coordinate value related to the terminal in the SLAM information is selected, that is, the SLAM coordinates of the terminal.

In the present embodiment, the SLAM coordinates are position information for positioning the terminal in three-dimensional space, and a position of the terminal in a SLAM space may be determined using the SLAM coordinates collected in real time by the SLAM apparatus.

SLAM can repeatedly observe characteristics of a surrounding environment based on sensor measurement data and a camera, establish an environment map, and locate its own position and pose at the same time. In particular, with visual SLAM, by using a binocular vision sensor or a camera, it can acquire as much azimuth feature information as possible at a relatively low cost (compared to lidar) to perform timely positioning of a local area environment and construction of a path feature map; and at the same time, combined with a visual depth image obtained by collecting image based on the binocular vision sensor or the camera, it can effectively provide three-dimensional occupancy information of obstacles, and can be used to reconstruct a local environment 3D scene map in time.

The terminal in the present embodiment is a terminal supporting SLAM or a terminal supporting visual SLAM, and the terminal may also be a mobile terminal supporting SLAM. Further, the mobile terminal supporting SLAM may include: a mobile terminal with hardware supporting SLAM and a mobile terminal installed with software supporting SLAM applications.

Step 103, converting, in response to determining that the GPS information meets a preset positioning difference condition, the SLAM coordinates into calculated geographic coordinates.

In the present embodiment, the preset positioning difference condition is a restriction condition set for the GPS information transmitted by the GPS. When the GPS information transmitted by the GPS meets the preset positioning difference condition, it is determined that the current GPS information is no longer suitable for performing an augmented reality navigation, and the current route cannot be located using the GPS information.

In the present embodiment, the preset positioning difference condition may include: the GPS coordinates in the GPS information continuously being origin coordinates of the GPS in a preset time period. Here, the origin coordinates of the GPS are an intersection of coordinate axes of the GPS, and the preset time period is a time preset according to a performance (a testing step size) of the GPS, for example, 3s. When the GPS coordinates in the GPS information are the origin coordinates, it is determined that positioning information of the terminal measured by the GPS is invalid.

Alternatively, the preset positioning difference condition may also include: a variation of each vector of the GPS coordinates in the GPS information in a preset time period is not greater than a preset value. The preset time period and the preset value may be adaptively set according to the performance of the GPS.

In some alternative implementations of the present embodiment, the preset positioning difference condition includes at least one of: a signal strength corresponding to the GPS information being less than or equal to a preset signal value; geographic coordinates corresponding to the GPS information being not within a preset coordinate range; and the GPS information corresponding to a building position in a preset map.

In this alternative implementation, the preset signal value is a minimum signal value that can be detected by the GPS. The preset signal value is used to define the strength of a GPS signal. If the signal strength corresponding to the GPS information is less than or equal to the preset signal value, it is determined that the GPS signal is weak.

In this alternative implementation, the GPS coordinates in the GPS information are converted into the geographic coordinates by using a projection transformation tool. The coordinates on the current route are located in the preset map data. The preset coordinate range is a coordinate range of the map data corresponding to the current route. When the geographic coordinates obtained by converting the GPS coordinates are not in the preset map data corresponding to the current route, it is determined that the geographic coordinates corresponding to the GPS information are not within the preset coordinate range. When it is determined from the map data of the preset map that the terminal is currently located at the building position in the preset map, the GPS signal is likely to be blocked by the building, and it is not appropriate to use the GPS for performing an augmented reality navigation at this time.

In this alternative implementation, setting the positioning difference condition to several different situations provides several reliable alternatives for the signal of GPS being weak, to cover situations where the GPS cannot perform the augmented reality navigation.

Figure 2:
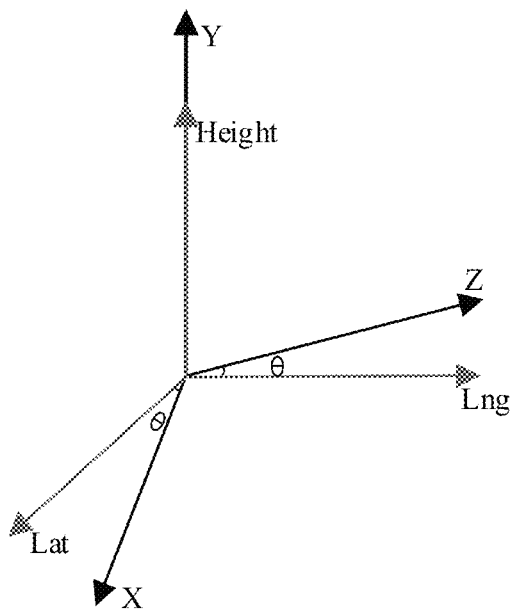
FIG. 2 is a corresponding relationship diagram between a geographic space and a SLAM space in an embodiment of the present disclosure.

In the present embodiment, by determining a conversion relationship between the geographic space and the SLAM space, it may be effectively ensured that the current SLAM coordinates of the terminal are used to implement the augmented reality navigation. Generally, the object lifts a mobile phone vertically to open and use the AR navigation, so the conversion relationship between the geographic space and the SLAM space, as shown in FIG. 2, has two characteristics: 1) A geographic origin of the geographic space corresponds to initialized GPS reference point of the AR navigation, the geographic coordinate origin (Lng0, Height0, Lat0) coincides with a SLAM coordinate origin (0, 0, 0) of the SLAM space. 2) A Height axis of the geographic space coincides with a Y axis of the SLAM space. Based on these two characteristics, the two spaces may approximately perform a rotation transformation around the Y-axis. By designing a rotation matrix, the coordinates of the two spaces may be converted into each other, so as to realize the conversion of the SLAM coordinates into the calculated geographic coordinates.

In some alternative implementations of the present embodiment, the converting, in response to determining that the GPS information meets the preset positioning difference condition, the SLAM coordinates into the calculated geographic coordinates, includes: calculating to obtain the rotation matrix, in response to determining that the GPS information meets the preset positioning difference condition, based on a pre-obtained deviation angle; obtaining offset coordinates based on the SLAM coordinates and the rotation matrix; and obtaining the calculated geographic coordinates based on the offset coordinates.

In the present embodiment, a deviation angle θ is a conversion angle between a GPS space coordinate system and a SLAM space coordinate system. Generally, the deviation angle may be a deviation angle relative to the true north in the geographic coordinates when the terminal is perpendicular to the center of the earth in a geographic coordinate system. The rotation matrix is a matrix that is obtained based on the deviation angle and represents a conversion relationship between the GPS space coordinate system and the SLAM coordinate system.

In this alternative implementation, the SLAM coordinates are converted into the calculated geographic coordinates, and output to a navigation engine in the executing body for road binding induction triggering, thereby realizing a continuous and uninterrupted augmented reality navigation. The calculated geographic coordinates may be obtained by using formula 1a and formula 1b to calculate in sequence.

$$\begin{bmatrix} Lng' \\ Height' \\ Lat' \end{bmatrix} = \frac{1}{\lambda} \begin{bmatrix} \cos\theta & 0 & \sin\theta \\ 0 & 1 & 0 \\ -\sin\theta & 0 & \cos\theta \end{bmatrix} \begin{bmatrix} z \\ y \\ x \end{bmatrix} \quad (1a)$$

$$\begin{bmatrix} Lng \\ Height \\ Lat \end{bmatrix} = \begin{bmatrix} Lng0 \\ Height0 \\ Lat0 \end{bmatrix} + \begin{bmatrix} Lng' \\ Height' \\ Lat' \end{bmatrix} \quad (1b)$$

In the formula 1a, each frame of the SLAM coordinates $$\begin{bmatrix} z \\ y \\ x \end{bmatrix}$$

is left-multiplied by the rotation matrix $$\begin{bmatrix} \cos\theta & 0 & \sin\theta \\ 0 & 1 & 0 \\ -\sin\theta & 0 & \cos\theta \end{bmatrix}$$

and $1/\lambda$ to obtain the offset coordinates $$\begin{bmatrix} Lng' \\ Height' \\ Lat' \end{bmatrix}$$

relative to the geographic coordinates, and then superimposed with reference geographic coordinates $$\begin{bmatrix} Lng0 \\ Height0 \\ Lat0 \end{bmatrix}$$

to obtain the calculated geographic coordinates $$\begin{bmatrix} Lng \\ Height \\ Lat \end{bmatrix}.$$

In the formula 1a, $\lambda$ is used to represent a proportional conversion relationship between a step size of the Mercator coordinate unit and the meter. Generally, $\lambda$ is approximately equal to 1.

In the present embodiment, the calculated geographic coordinates are the coordinates obtained after the SLAM coordinates being transformed by the rotation matrix, the rotation matrix is obtained through the pre-obtained deviation angle, the offset coordinates are obtained by multiplying the rotation matrix and the SLAM coordinates, and the calculated geographic coordinates are obtained from the offset coordinates. The conversion relationship between the geographic coordinates and the SLAM may be effectively restored, ensuring the reliability of obtaining the calculated geographic coordinates.

Step 104, performing an augmented reality navigation on the current route based on the calculated geographic coordinates.

In the present embodiment, the calculated geographic coordinates are geographic coordinates in a world coordinate system converted from the SLAM coordinates when the GPS information cannot be used. Generally, the calculated geographic coordinates are three-dimensional coordinates. When the augmented reality navigation performed through the GPS is a two-dimensional image navigation, the augmented reality navigation based on the calculated geographic coordinates is an augmented reality navigation in the three-dimensional space.

In the present embodiment, the calculated geographic coordinates have the same function as the geographic coordinates obtained from the GPS information. The calculated geographic coordinates are sent to a road binding induction unit of the augmented reality navigation to trigger the road binding induction, so that the current route may be accurately navigated in the augmented reality. It should be noted that, the executing body on which the method for a route navigation runs provided by the present embodiment may also implement the function of the road binding induction unit.

When the GPS is interrupted in tunnels or high buildings, the method for a route navigation provided by the present embodiment may use the visual SLAM technology to realize relative position estimation, so that the object can complete the navigation continuously.

The method and apparatus for a route navigation provided by embodiments of the present disclosure first perform an augmented reality navigation on the current route based on real-time acquired GPS information of the terminal; secondly acquire SLAM coordinates of the terminal; then convert, in response to determining that the GPS information meets the preset positioning difference condition, the SLAM coordinates into calculated geographic coordinates; and finally perform an augmented reality navigation on the current route based on the calculated geographic coordinates. Therefore, when a GPS signal meets the preset positioning difference condition, the SLAM coordinates may be applied to the augmented reality navigation in time, which avoids the situation of wrong route indication, improves the accuracy of geolocation when virtual and real scenes are combined together, and improves the accuracy of augmented reality navigation.

In another embodiment of the present disclosure, before the step of converting, in response to determining that the GPS information meets the preset positioning difference condition, the SLAM coordinates into the calculated geographic coordinates, the method further includes: calculating to obtain actual geographic coordinates based on the current route; mapping the actual geographic coordinates to a pose of SLAM; generating a tracking anchor in a 3D model of an augmented reality navigation based on the pose; and adding an augmented reality identification on the tracking anchor, so that the augmented reality identification corresponds to the tracking anchor in real time.

The executing body on which the method for a route navigation runs provided by the present embodiment may implement the two functions of route induction and 3D AR identification rendering. When the executing body implements the route induction function, the SLAM coordinates are offset converted into the calculated geographic coordinates. The calculated geographic coordinates take a reference positioning point corresponding to the GPS information as a reference point, and the calculated geographic coordinates may implement positioning estimation after the GPS signal is interrupted. The calculated geographic coordinates are input into the navigation engine of the executing body for the route induction function. The navigation engine may display the current route and the position of the terminal on the current route in real time on an augmented reality display interface, and may also continuously output text and voice induction for the current route, realizing GPS-free navigation.

When the executing body implements the 3D AR identification rendering function, the AR identification may be set in some areas of the 3D model to indicate the augmented reality display interface to display road signs and special points (for example, turning points, road breakpoints) of the current route.

In the present embodiment, based on the current route combined with the GPS information and the pre-established 3D model of augmented reality navigation, road signs and special points in the 3D model may be determined, and augmented reality identifications that track these road signs and special points may be added to the 3D model. It should be noted that, the augmented reality identifications added to the road signs and special points may be the same or different depending on types and models or the like of the road signs and special points.

Further, the actual geographic coordinates of the current route are converted into the pose of the SLAM, and the tracking anchor is added at the special point in combination with the pose of the SLAM, which may make a tracking effect of the tracking anchor better.

In the present embodiment, the geographic coordinates of the route are mapped to SLAM spatial coordinates and the tracking anchor is generated. Then, a 3D route arrow model is placed on the corresponding tracking anchor, and a SLAM tracking capability is used to make movements and perspective effect of 3D route road signs delicate and close to reality, realizing an immersive navigation experience that seamlessly fits between virtual and real.

In some alternative implementations of the present embodiment, the mapping the actual geographic coordinates to the pose of the SLAM, includes: obtaining offset coordinates based on actual reference coordinates and the actual geographic coordinates; calculating to obtain a rotation matrix based on a pre-obtained deviation angle; and left-multiplying the offset coordinates by a transpose matrix of the rotation matrix to obtain the pose of the SLAM.

In the present embodiment, the deviation angle is the θ angle as shown in FIG. 2. The deviation angle is a declination angle of the terminal relative to the true north direction in the geographic coordinates after the terminal is vertically lifted relative to the center of the earth when the object is performing augmented navigation. The declination angle may be directly measured and obtained by a sensor (such as a gyroscope), the rotation matrix between the SLAM space coordinate system and the GPS coordinate system may be obtained through the deviation angle θ, and the pose of the SLAM may be obtained further through the rotation matrix.

Alternatively, the deviation angle may alternatively be obtained by calculation when the object uses the terminal. The deviation angle may be obtained by calculation steps as follows: after the terminal is turned on, detecting whether the terminal is in a vertical state relative to the center of the earth; and in response to the terminal being in the vertical state, calculating to obtain the deviation angle based on the GPS coordinates corresponding to the GPS information and the SLAM coordinates.

In this alternative implementation, formula 2a and formula 2b may be used for calculation in sequence, and the pose of the SLAM (represented by coordinates of the pose of the SLAM) may be obtained.

$$\begin{bmatrix} Lng' \\ Height' \\ Lat' \end{bmatrix} = \begin{bmatrix} Lng \\ Height \\ Lat \end{bmatrix} - \begin{bmatrix} Lng0 \\ Height0 \\ Lat0 \end{bmatrix} \quad (2a)$$

$$\begin{bmatrix} z \\ y \\ x \end{bmatrix} = \lambda \begin{bmatrix} \cos\theta & 0 & -\sin\theta \\ 0 & 1 & 0 \\ \sin\theta & 0 & \cos\theta \end{bmatrix} \begin{bmatrix} Lng' \\ Height' \\ Lat' \end{bmatrix} \quad (2b)$$

In the formula 2a, an offset between the actual geographic coordinates $$\begin{bmatrix} Lng \\ Height \\ Lat \end{bmatrix}$$

and the actual reference coordinates $$\begin{bmatrix} Lng0 \\ Height0 \\ Lat0 \end{bmatrix}$$

is calculated to obtain the offset coordinates $$\begin{bmatrix} Lng' \\ Height' \\ Lat' \end{bmatrix}$$

relative to the geographic coordinates. In the formula 2b, the offset coordinates are left-multiplied by the transpose matrix $$\begin{bmatrix} \cos\theta & 0 & -\sin\theta \\ 0 & 1 & 0 \\ \sin\theta & 0 & \cos\theta \end{bmatrix}$$

of the rotation matrix and a coefficient $\lambda$ to obtain the coordinates $$\begin{bmatrix} z \\ y \\ x \end{bmatrix}$$

of the pose of the SLAM. The coordinates of the pose of the SLAM are used to track and place the 3D model of augmented reality, so as to realize an AR effect of combining virtual and real. The coefficient $\lambda$ is used to represent a proportional conversion relationship between a step size of the Mercator coordinate unit and the meter. Generally, $\lambda$ is approximately equal to 1.

In the present embodiment, both the reference geographic coordinates and the actual reference coordinates are initial coordinates corresponding to the GPS information, and are also initial coordinate values of the GPS.

In this alternative implementation, based on the pre-obtained deviation angle, the rotation matrix is calculated, and the pose of the SLAM is obtained through the rotation matrix, which may ensure the reliability of the SLAM pose calculation and ensure a display effect of the augmented reality identification.

Under normal circumstances, SLAM positioning estimation relies on a sensor accuracy and a surrounding magnetic field environment, which is prone to accumulative errors in long-distance positioning estimation. In another embodiment of the present disclosure, before the step of converting, in response to determining that the GPS information meets the preset positioning difference condition, the SLAM coordinates into the calculated geographic coordinates, the method further includes: calibrating the SLAM coordinates, so as to use the calibrated SLAM coordinates to perform the conversion of the calculated geographic coordinates.

Figure 3:
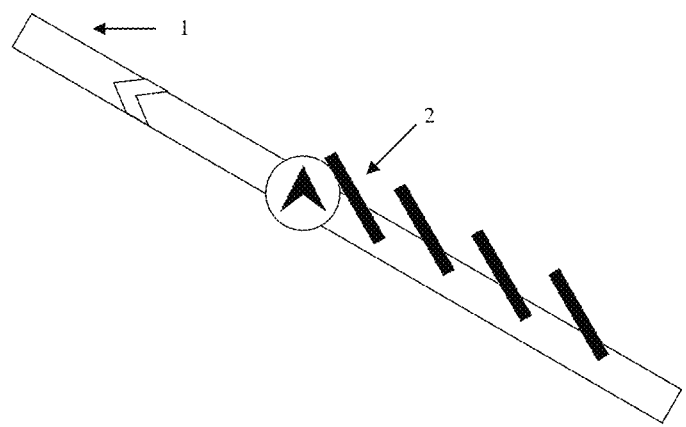
FIG. 3 is a corresponding relationship diagram between uncalibrated SLAM and a current route in an embodiment of the present disclosure.

In practical applications, SLAM positioning is prone to accumulative errors (caused by a sensor accuracy), and a positioning effect is poor after an estimated distance is greater than 100M. The effect is as shown in FIG. 3. It may be seen that SLAM positioning 2 always maintains a certain included angle with route 1.

In this alternative implementation, based on a fixed deviation in route positioning of the SLAM in practice, this deviation may be decomposed (for example, X-axis deviation, Y-axis deviation, Z-axis deviation) to obtain a coordinate compensation value. When the SLAM coordinates are used for performing an augmented reality navigation, the coordinate compensation value may be added to the SLAM coordinates to achieve the purpose of calibrating the SLAM coordinates.

Alternatively, during the navigation, the SLAM coordinates may also be calibrated in combination with features of the current route. For example, if the current route is a curve, different coordinate compensation values are set for the curvature of different sections on the current route, so as to compensate the different coordinate compensation values for the SLAM coordinates corresponding to the road sections with different curvatures.

In this alternative implementation, by calibrating the SLAM, the accumulative errors may be eliminated and a positioning accuracy may be improved.

In some alternative implementations of the present embodiment, the calibrating the SLAM coordinates includes: calculating a step size between the SLAM coordinates and a reference point; and performing a projection processing on the SLAM coordinates based on a direction of the current route, to obtain calibrated SLAM coordinates.

In view of the fact that SLAM navigation cannot strictly follow the current route in actual practice, resulting in a larger positioning error as going further, in this alternative implementation, the performing projection processing on the SLAM coordinates includes: for each SLAM coordinates B, calculating a step size s with a reference point A (lng0, lat0). Then, based on a direction a of the current route, using the following formulas (3a, 3b) to project with an equal step size:

$$lng1 = s*\sin \alpha + lng0; \tag{3a}$$

$$lat1 = s*\sin \alpha + lat0; \tag{3b}$$

Figure 4:
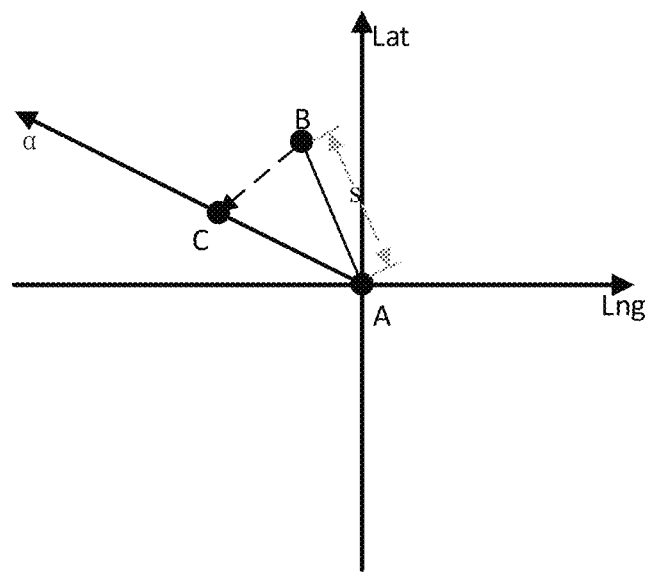
FIG. 4 is a corresponding relationship diagram between SLAM coordinates and a projection point in an embodiment of the present disclosure.

By projecting to the direction of the current route, coordinates C (lng1, lat1) of a projection point may be obtained, where the reference point A is a previous positioning point of the current SLAM coordinates before one step size positioning is performed, the SLAM positioning step size is a unit length of the SLAM apparatus when positioning, and an included angle of the direction a of the current route relative to the true north direction in the geographic coordinates of the current route, is as shown in FIG. 4. According to the above formulas 3a and 3b, the projection point of each SLAM coordinate may be obtained, so that the current route may be strictly followed, and the accumulative errors can be effectively eliminated. After the projection processing, the SLAM coordinates generate a SLAM positioning trajectory. The SLAM positioning trajectory strictly follows the direction of the current route, which can meet long-distance (for example, about 800M) navigation needs.

In this alternative implementation, performing the projection processing on the SLAM coordinates based on the direction of the current route may make the processed SLAM coordinates follow the current route in real time along the direction of the current route, which improves the accuracy of SLM positioning of the current route.

The method for a route navigation provided by some embodiments of the present disclosure, by using visual SLAM tracking technology, can not only improve the immersive navigation experience combining virtual and real, but also output tracking and positioning to solve the sore point of unable to continue navigation after the GPS signal is interrupted. After subsequent continuous optimization, the SLAM positioning estimation effect may be extended to about 800M, which can meet more than 95% of domestic tunnel scene navigation needs. In other scenarios, such as high buildings where the GPS is interrupted, the SLAM positioning estimation may also be activated to ensure a continuous navigation experience.

Figure 5:
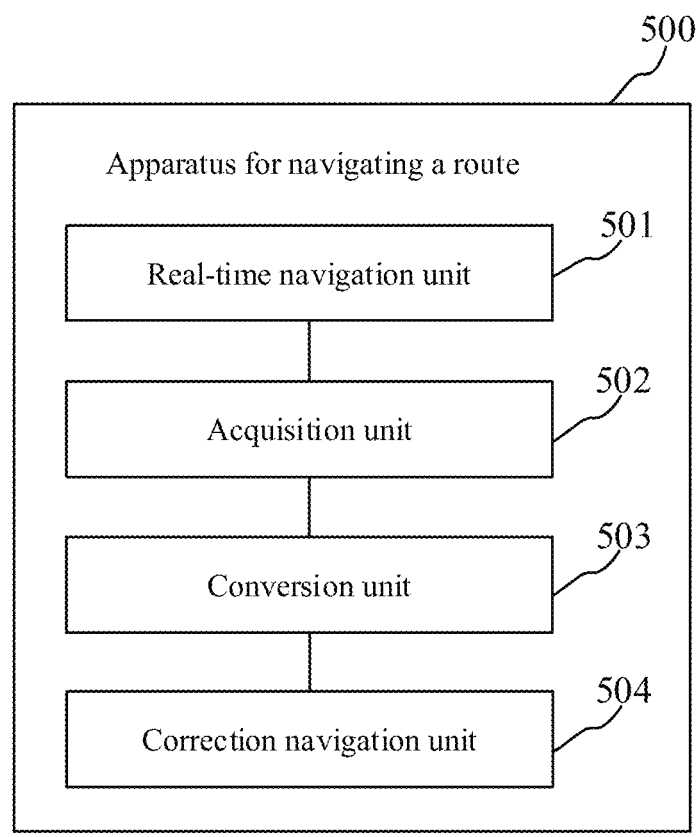
FIG. 5 is a schematic structural diagram of an embodiment of an apparatus for a route navigation according to an embodiment of the present disclosure.

Further referring to FIG. 5, as an implementation of the method shown in each of the above figures, an embodiment of the present disclosure provide an apparatus for a route navigation. The embodiment of the apparatus corresponds to the embodiment of the method shown in FIG. 1, and the apparatus is particularly applicable to various electronic devices.

As shown in FIG. 5, the apparatus 500 for a route navigation provided by the present embodiment includes: a real-time navigation unit 501, an acquisition unit 502, a conversion unit 503, and a correction navigation unit 504. The real-time navigation unit 501 may be configured to perform an augmented reality navigation on a current route based on real-time acquired GPS information of a terminal. The acquisition unit 502 may be configured to acquire SLAM coordinates of the terminal. The conversion unit 503 may be configured to convert, in response to determining that the GPS information meets a preset positioning difference condition, the SLAM coordinates into calculated geographic coordinates. The correction navigation unit 504 may be configured to perform an augmented reality navigation on the current route based on the calculated geographic coordinates.

In the present embodiment, for the specific processing of the real-time navigation unit 501, the acquisition unit 502, the conversion unit 503, and the correction navigation unit 504 in the apparatus 500 for a route navigation and the technical effects thereof, reference may be made to the relevant description of step 101, step 102, step 103, and step 104 in the embodiment corresponding to FIG. 1, and detailed description thereof will be omitted.

In some alternative implementations of the present embodiment, the apparatus 500 further includes: a calculation unit (not shown in the figure), a mapping unit (not shown in the figure), a generation unit (not shown in the figure), and an adding unit (not shown in the figure). The calculation unit may be configured to calculate to obtain actual geographic coordinates based on the current route. The mapping unit may be configured to map the actual geographic coordinates to a pose of SLAM. The generation unit may be configured to generate a tracking anchor in a 3D model of the augmented reality navigation based on the pose. The adding unit may be configured to add an augmented reality identification on the tracking anchor, so that the augmented reality identification corresponds to the tracking anchor in real time.

In some alternative implementations of the present embodiment, the mapping unit includes: an offset module (not shown in the figure), a rotation calculation module (not shown in the figure), and a pose obtaining module (not shown in the figure). The offset module may be configured to obtain offset coordinates based on actual reference coordinates and the actual geographic coordinates. The rotation calculation module may be configured to calculate to obtain a rotation matrix based on a pre-obtained deviation angle. The pose obtaining module may be configured to left-multiply the offset coordinates by a transpose matrix of the rotation matrix to obtain the pose of the SLAM.

In some alternative implementations of the present embodiment, the apparatus further includes: a calibration unit (not shown in the figure). The calibration unit may be configured to calibrate the SLAM coordinates.

In some alternative implementations of the present embodiment, the calibration unit includes: a step size calculation module (not shown in the figure), and a projection module (not shown in the figure). The step size calculation module may be configured to calculate a step size between the SLAM coordinates and a reference point. The projection module may be configured to perform a projection processing on the SLAM coordinates based on a direction of the current route, to obtain calibrated SLAM coordinates.

In some alternative implementations of the present embodiment, the conversion unit 503 includes: a matrix calculation module (not shown in the figure), a matrix obtaining module (not shown in the figure), and a coordinate calculation module (not shown in the figure). The matrix calculation module may be configured to calculate to obtain the rotation matrix, in response to determining that the GPS information meets the preset positioning difference condition, based on the pre-obtained deviation angle. The matrix obtaining module may be configured to obtain the offset coordinates based on the SLAM coordinates and the rotation matrix. The coordinate calculation module may be configured to obtain the calculated geographic coordinates based on the offset coordinates.

In some alternative implementations of the present embodiment, the positioning difference condition includes at least one of: a signal strength corresponding to the GPS information being less than or equal to a preset signal value; geographic coordinates corresponding to the GPS information being not within a preset coordinate range; and the GPS information corresponding to a building position in a preset map.

According to the apparatus for a route navigation provided by the embodiments of the present disclosures, first, the real-time navigation unit 501 performs an augmented reality navigation on the current route based on real-time acquired GPS information of the terminal; secondly, the acquisition unit 502 acquires SLAM coordinates of the terminal; then, the conversion unit 503 converts, in response to determining that the GPS information meets the preset positioning difference condition, the SLAM coordinates into calculated geographic coordinates; and finally, the correction navigation unit 504 performs an augmented reality navigation on the current route based on the calculated geographic coordinates. Therefore, when a GPS signal meets the preset positioning difference condition, the SLAM coordinates may be applied to the augmented reality navigation in time, which avoids the situation of wrong route indication, improves geographic accuracy when virtual and real scenes are combined together, and improves navigation accuracy.

In the technical solution of the present disclosure, the collection, storage, use, processing, transmission, provision and disclosure of the user personal information are all in accordance with the provisions of the relevant laws and regulations, and the public order and good customs are not violated.

According to an embodiment of the present disclosure, the present disclosure also provides an electronic device, a readable storage medium, and a computer program product.

Figure 6:
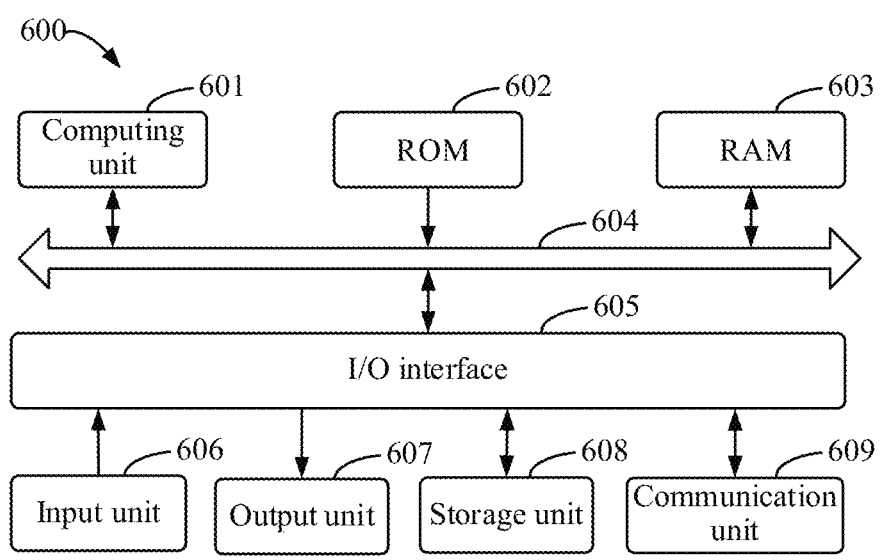
FIG. 6 is a block diagram of an electronic device used to implement the method for a route navigation of an embodiment of the present disclosure.

FIG. 6 shows a schematic block diagram of an example electronic device 600 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the device 600 includes a computing unit 601, which may perform various appropriate actions and processing, based on a computer program stored in a read-only memory (ROM) 602 or a computer program loaded from a storage unit 608 into a random access memory (RAM) 603. In the RAM 603, various programs and data required for the operation of the device 600 may also be stored. The computing unit 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, for example, a keyboard and a mouse; an output unit 607, for example, various types of displays and speakers; the storage unit 608, for example, a disk and an optical disk; and a communication unit 609, for example, a network card, a modem, or a wireless communication transceiver. The communication unit 609 allows the device 600 to exchange information/data with other devices over a computer network such as the Internet and/or various telecommunication networks.

The computing unit 601 may be various general-purpose and/or dedicated processing components having processing and computing capabilities. Some examples of the computing unit 601 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 601 performs the various methods and processes described above, such as the method for a route navigation. For example, in some embodiments, the method for a route navigation may be implemented as a computer software program, which is tangibly included in a machine readable medium, such as the storage unit 608. In some embodiments, part or all of the computer program may be loaded and/or installed on the device 600 via the ROM 602 and/or the communication unit 609. When the computer program is loaded into the RAM 603 and executed by the computing unit 601, one or more steps of the method for a route navigation described above may be performed. Alternatively, in other embodiments, the computing unit 601 may be configured to perform the method for a route navigation by any other appropriate means (for example, by means of firmware).

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input apparatus and at least one output apparatus, and send the data and instructions to the storage system, the at least one input apparatus and the at least one output apparatus.

Program codes for implementing the method of the present disclosure may be compiled using any combination of one or more programming languages. The program codes may be provided to a processor or controller of a general purpose computer, a specific purpose computer, or other programmable apparatuses for data processing, such that the program codes, when executed by the processor or controller, cause the functions/operations specified in the flowcharts and/or block diagrams to be implemented. The program codes may be completely executed on a machine, partially executed on a machine, partially executed on a machine and partially executed on a remote machine as a separate software package, or completely executed on a remote machine or server.

In the context of some embodiments of the present disclosure, a machine readable medium may be a tangible medium which may contain or store a program for use by, or used in combination with, an instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include an electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or an LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or tactile feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server may be a cloud server, or a server of a distributed system, or a server combined with a blockchain.

It should be understood that the various forms of processes shown above may be used to reorder, add, or delete steps. For example, the steps disclosed in some embodiments of the present disclosure may be executed in parallel, sequentially, or in different orders, as long as the desired results of the technical solutions mentioned in some embodiments of the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for a route navigation, the method comprising:
    performing an augmented reality navigation on a current route based on real-time acquired GPS information of a terminal;
    acquiring SLAM (simultaneous localization and mapping) coordinates of the terminal in a SLAM coordinate system;
    mapping geographic coordinates of the current route in a geographic coordinate system to SLAM coordinates of the current route in the SLAM coordinate system;
    generating a tracking anchor in a 3D model of a preset map based on the SLAM coordinates of the current route, wherein the tracking anchor is configured to track a road sign or a target point of the current route;
    adding an augmented reality model on the tracking anchor, so that the augmented reality model corresponds to the tracking anchor in real time;
    converting, in response to determining that the GPS information meets a preset positioning difference condition, the SLAM coordinates of the terminal in the SLAM coordinate system into calculated geographic coordinates in the geographic coordinate system based on a conversion relationship between the SLAM coordinate system and the geographic coordinate system; and
    performing the augmented reality navigation on the current route based on the calculated geographic coordinates of the terminal,
    wherein before a step of the converting, in response to determining that the GPS information meets the preset positioning difference condition, the SLAM coordinates into the calculated geographic coordinates, the method further comprises:
        calculating a length between a current positioning point and a reference positioning point in the SLAM coordinate system;
        determining a SLAM coordinate of a projection point in a direction of the current route based on the length between the current positioning point and the reference positioning point, the direction of the current route and a SLAM coordinate of the reference positioning point, wherein the SLAM coordinate of the projection point is equal to a sum of the SLAM coordinate of the reference positioning point and a target value, the target value being determined based on the length between the current positioning point and the reference positioning point, and an included angle between the direction of the current route and a reference direction; and
        using the SLAM coordinate of the projection point as a calibrated SLAM coordinate of the current positioning point.

2. The method according to claim 1, wherein the mapping the actual geographic coordinates to the pose of the SLAM, comprises:
    obtaining relative coordinates based on actual reference coordinates in the geographic coordinate system and the actual geographic coordinates;
    calculating a rotation matrix based on a pre-obtained deviation angle between the geographic coordinate system and the SLAM coordinate system; and
    obtaining the SLAM coordinates based on the relative coordinates and a transpose matrix of the rotation matrix.

3. The method according to claim 1, wherein the converting, in response to determining that the GPS information meets the preset positioning difference condition, the SLAM coordinates into the calculated geographic coordinates, comprises:
    calculating, in response to determining that the GPS information meets the preset positioning difference condition, to obtain a rotation matrix based on the pre-obtained deviation angle;
    obtaining the relative coordinates based on the SLAM coordinates and the rotation matrix; and
    obtaining the calculated geographic coordinates based on the relative coordinates.

4. The method according to claim 3, wherein the positioning difference condition comprises at least one of:
    a signal strength corresponding to the GPS information being less than or equal to a preset signal value;
    geographic coordinates corresponding to the GPS information being not within a preset coordinate range; and
    the GPS information corresponding to a building position in a preset map.

5. The method according to claim 1, wherein adding the augmented reality model on the tracking anchor comprises:
    adding an arrow on the tracking anchor.

6. An electronic device, comprising:
    at least one processor; and
    a memory communicatively connected to the at least one processor; wherein,
    the memory stores instructions executable by the at least one processor, and the instructions, when executed by the at least one processor, cause the at least one processor to perform operations comprising:
        performing an augmented reality navigation on a current route based on real-time acquired GPS information of a terminal;
        acquiring SLAM (simultaneous localization and mapping) coordinates of the terminal in a SLAM coordinate system;

mapping geographic coordinates of the current route in a geographic coordinate system to SLAM coordinates of the current route in the SLAM coordinate system;
generating a tracking anchor in a 3D model of a preset map based on the SLAM coordinates of the current route, wherein the tracking anchor is configured to track a road sign or a target point of the current route;
adding an augmented reality model on the tracking anchor, so that the augmented reality model corresponds to the tracking anchor in real time;
converting, in response to determining that the GPS information meets a preset positioning difference condition, the SLAM coordinates of the terminal in the SLAM coordinate system into calculated geographic coordinates in the geographic coordinate system based on a conversion relationship between the SLAM coordinate system and the geographic coordinate system; and
performing the augmented reality navigation on the current route based on the calculated geographic coordinates,
wherein before a step of the converting, in response to determining that the GPS information meets the preset positioning difference condition, the SLAM coordinates into the calculated geographic coordinates, the method further comprises:
calculating a length between a current positioning point and a reference positioning point in the SLAM coordinate system;
determining a SLAM coordinate of a projection point in a direction of the current route based on the length between the current positioning point and the reference positioning point, the direction of the current route and a SLAM coordinate of the reference positioning point, wherein the SLAM coordinate of the projection point is equal to a sum of the SLAM coordinate of the reference positioning point and a target value, the target value being determined based on the length between the current positioning point and the reference positioning point, and an included angle between the direction of the current route and a reference direction; and
using the SLAM coordinate of the projection point as a calibrated SLAM coordinate of the current positioning point.

7. The electronic device according to claim 6, wherein the mapping the actual geographic coordinates to the pose of the SLAM, comprises:
obtaining relative coordinates based on actual reference coordinates in the geographic coordinate system and the actual geographic coordinates;
calculating a rotation matrix based on a pre-obtained deviation angle between the geographic coordinate system and the SLAM coordinate system; and
obtaining the SLAM coordinates based on the relative coordinates and a transpose matrix of the rotation matrix.

8. The electronic device according to claim 6, wherein the converting, in response to determining that the GPS information meets the preset positioning difference condition, the SLAM coordinates into the calculated geographic coordinates, comprises:
calculating, in response to determining that the GPS information meets the preset positioning difference condition, to obtain a rotation matrix based on the pre-obtained deviation angle;
obtaining the relative coordinates based on the SLAM coordinates and the rotation matrix; and
obtaining the calculated geographic coordinates based on the relative coordinates.

9. The electronic device according to claim 8, wherein the positioning difference condition comprises at least one of:
a signal strength corresponding to the GPS information being less than or equal to a preset signal value;
geographic coordinates corresponding to the GPS information being not within a preset coordinate range; and
the GPS information corresponding to a building position in a preset map.

10. A non-transitory computer readable storage medium storing computer instructions, wherein, the computer instructions cause a computer to perform operations comprising:
performing an augmented reality navigation on a current route based on real-time acquired GPS information of a terminal;
acquiring SLAM (simultaneous localization and mapping) coordinates of the terminal in a SLAM coordinate system;
mapping geographic coordinates of the current route in a geographic coordinate system to SLAM coordinates of the current route in the SLAM coordinate system;
generating a tracking anchor in a 3D model of a preset map based on the SLAM coordinates of the current route, wherein the tracking anchor is configured to track a road sign or a target point of the current route;
adding an augmented reality model on the tracking anchor, so that the augmented reality model corresponds to the tracking anchor in real time;
converting, in response to determining that the GPS information meets a preset positioning difference condition, the SLAM coordinates of the terminal in the SLAM coordinate system into calculated geographic coordinates in the geographic coordinate system based on a conversion relationship between the SLAM coordinate system and the geographic coordinate system; and
performing the augmented reality navigation on the current route based on the calculated geographic coordinates,
wherein before a step of the converting, in response to determining that the GPS information meets the preset positioning difference condition, the SLAM coordinates into the calculated geographic coordinates, the method further comprises:
calculating a length between a current positioning point and a reference positioning point in the SLAM coordinate system;
determining a SLAM coordinate of a projection point in a direction of the current route based on the length between the current positioning point and the reference positioning point, the direction of the current route and a SLAM coordinate of the reference positioning point, wherein the SLAM coordinate of the projection point is equal to a sum of the SLAM coordinate of the reference positioning point and a target value, the target value being determined based on the length between the current positioning point and the reference positioning point, and an included angle between the direction of the current route and a reference direction; and
using the SLAM coordinate of the projection point as a calibrated SLAM coordinate of the current positioning point.

11. The storage medium according to claim 10, wherein the mapping the actual geographic coordinates to the pose of the SLAM, comprises:
- obtaining relative coordinates based on actual reference coordinates in the geographic coordinate system and the actual geographic coordinates;
- calculating a rotation matrix based on a pre-obtained deviation angle between the geographic coordinate system and the SLAM coordinate system; and
- obtaining the SLAM coordinates based on the relative coordinates and a transpose matrix of the rotation matrix.

12. The storage medium according to claim 10, wherein the converting, in response to determining that the GPS information meets the preset positioning difference condition, the SLAM coordinates into the calculated geographic coordinates, comprises:
- calculating, in response to determining that the GPS information meets the preset positioning difference condition, to obtain a rotation matrix based on the pre-obtained deviation angle;
- obtaining the relative coordinates based on the SLAM coordinates and the rotation matrix; and
- obtaining the calculated geographic coordinates based on the relative coordinates.

* * * * *